United States Patent Office 3,514,682
Patented May 26, 1970

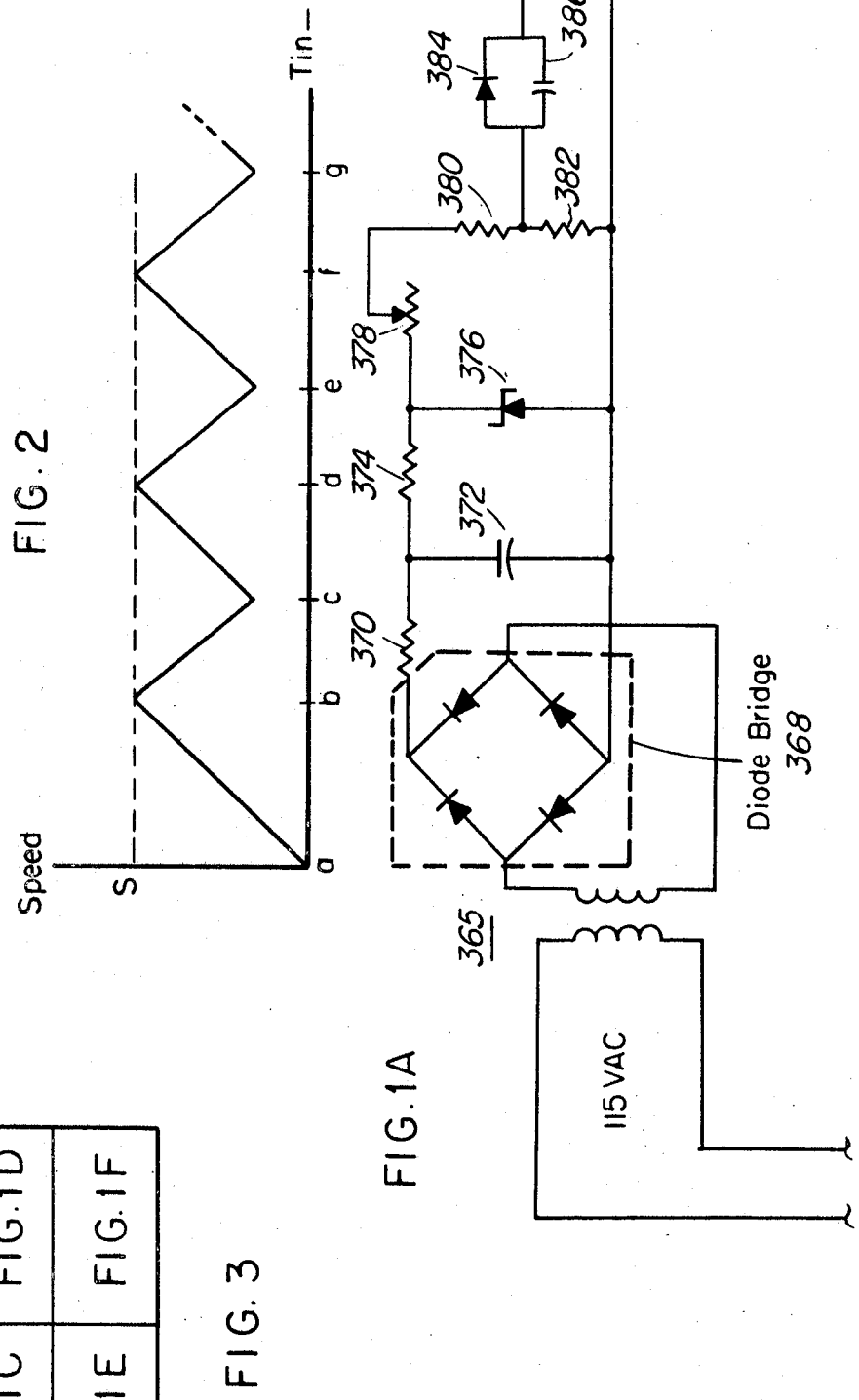

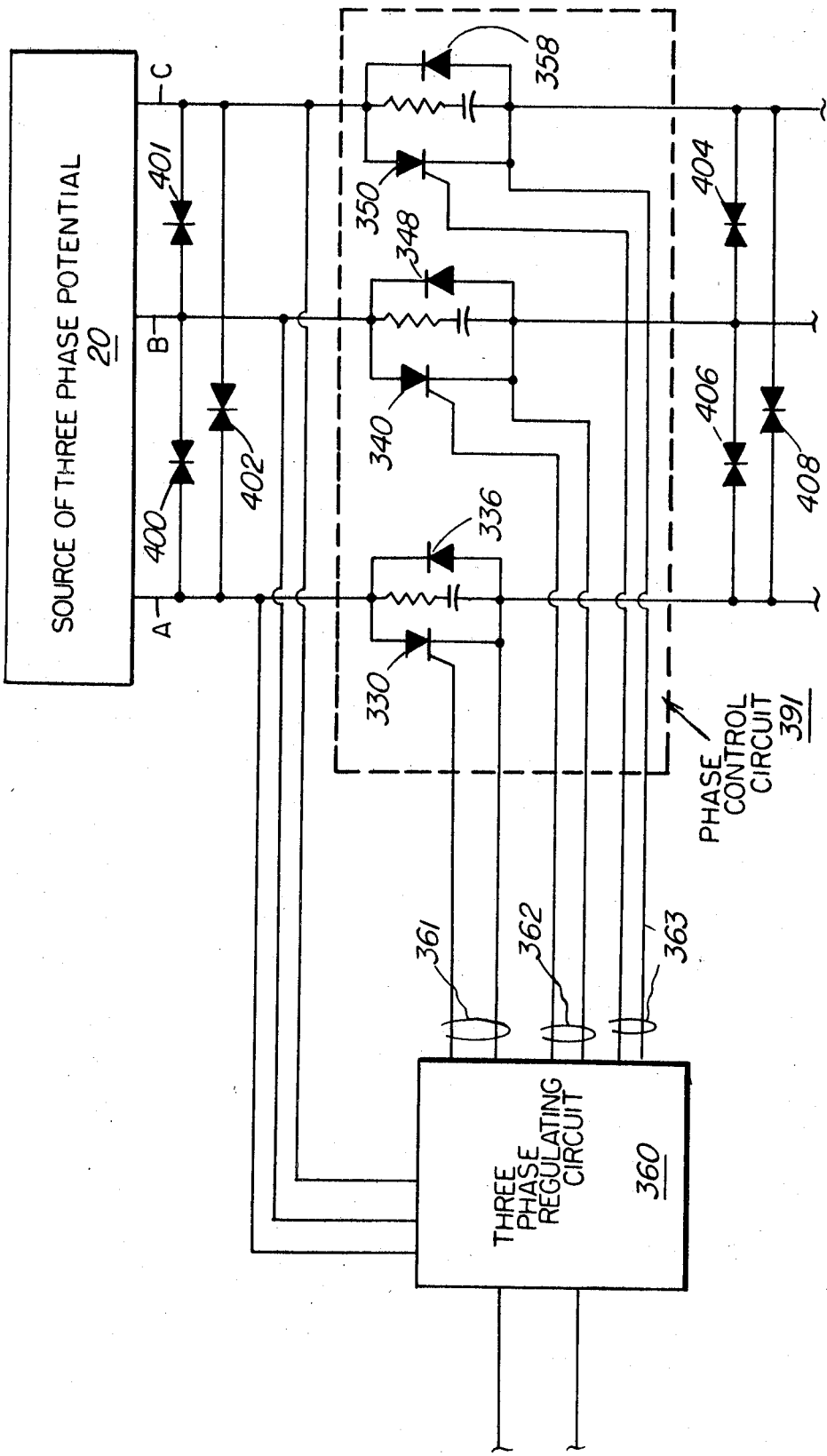

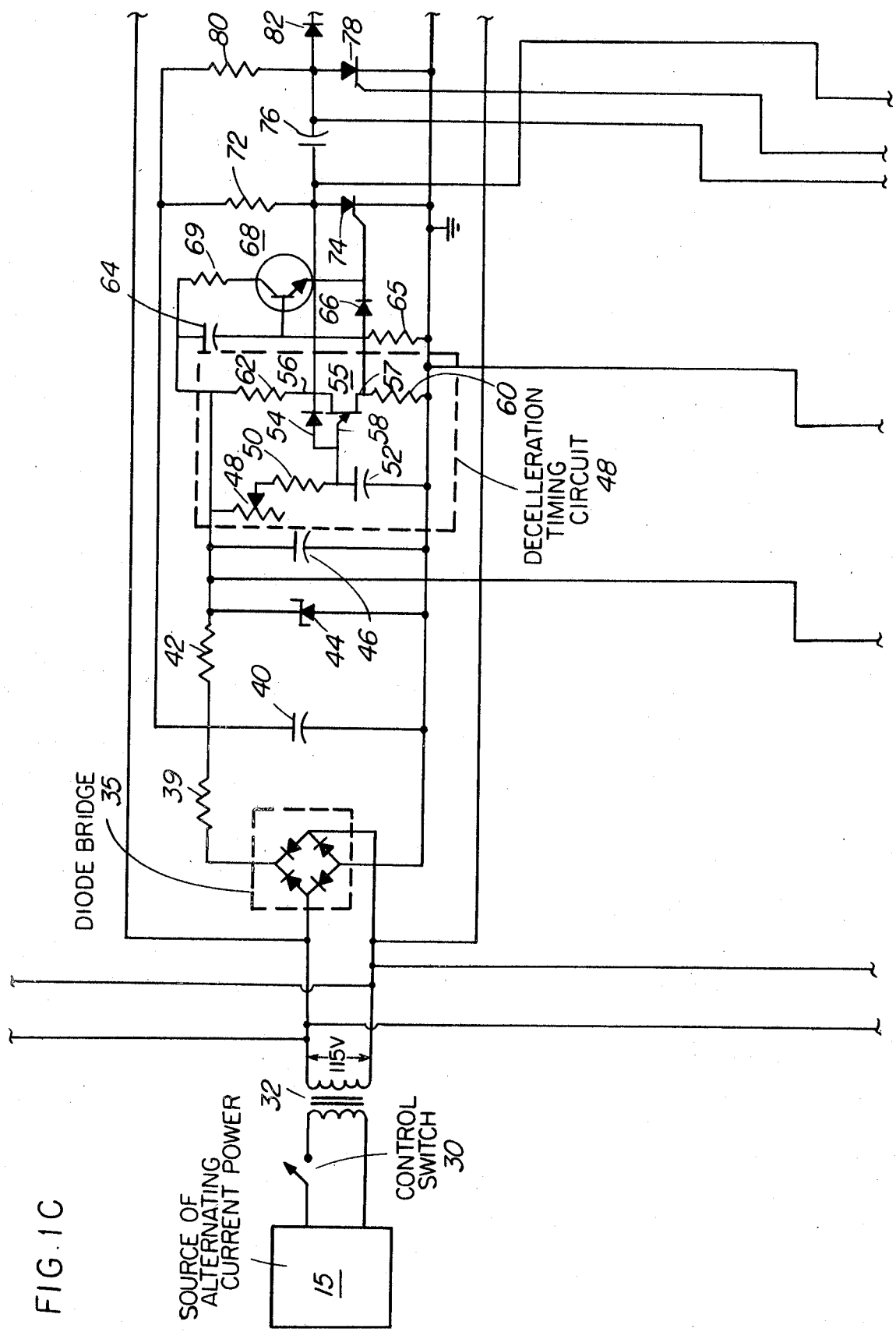

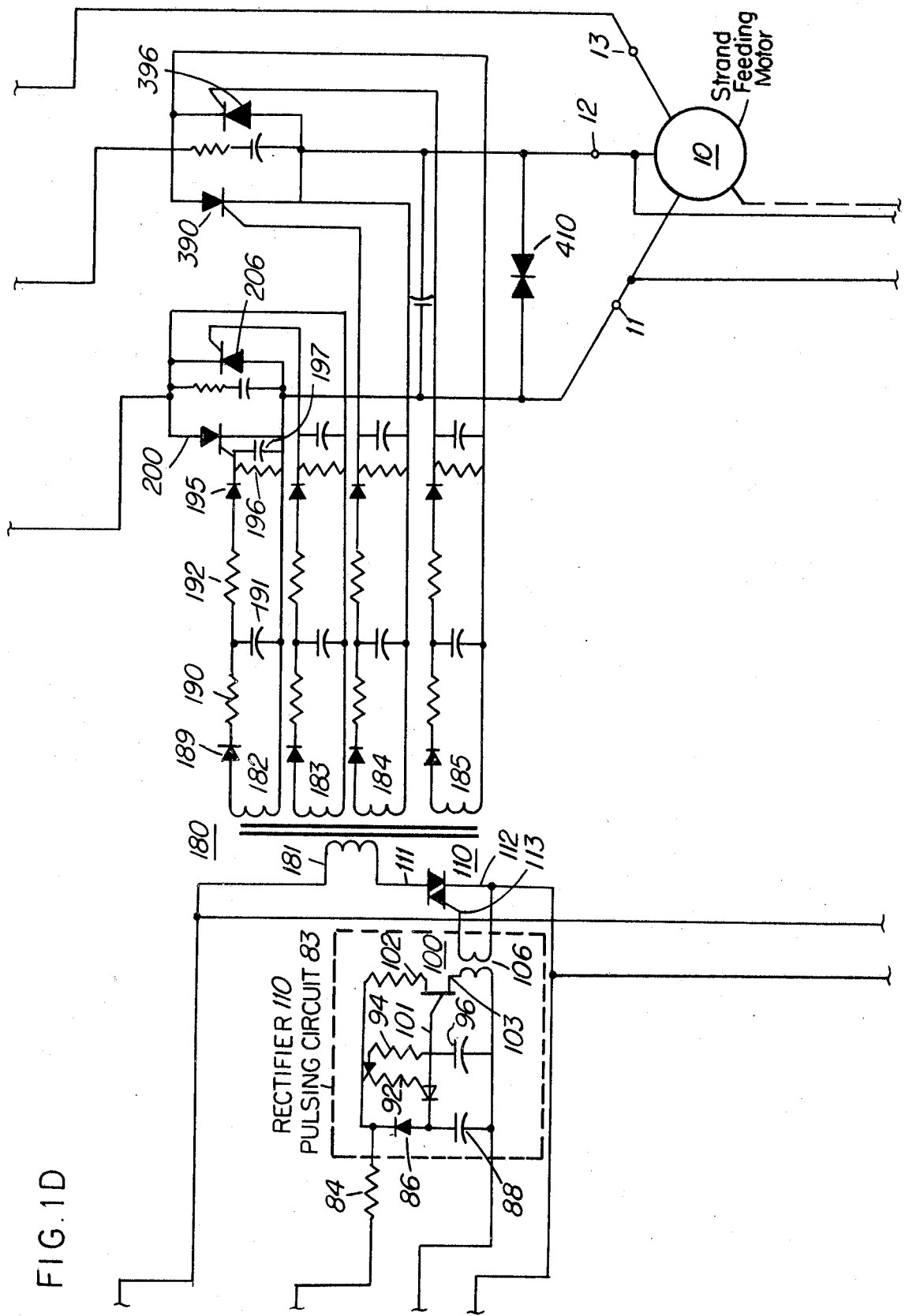

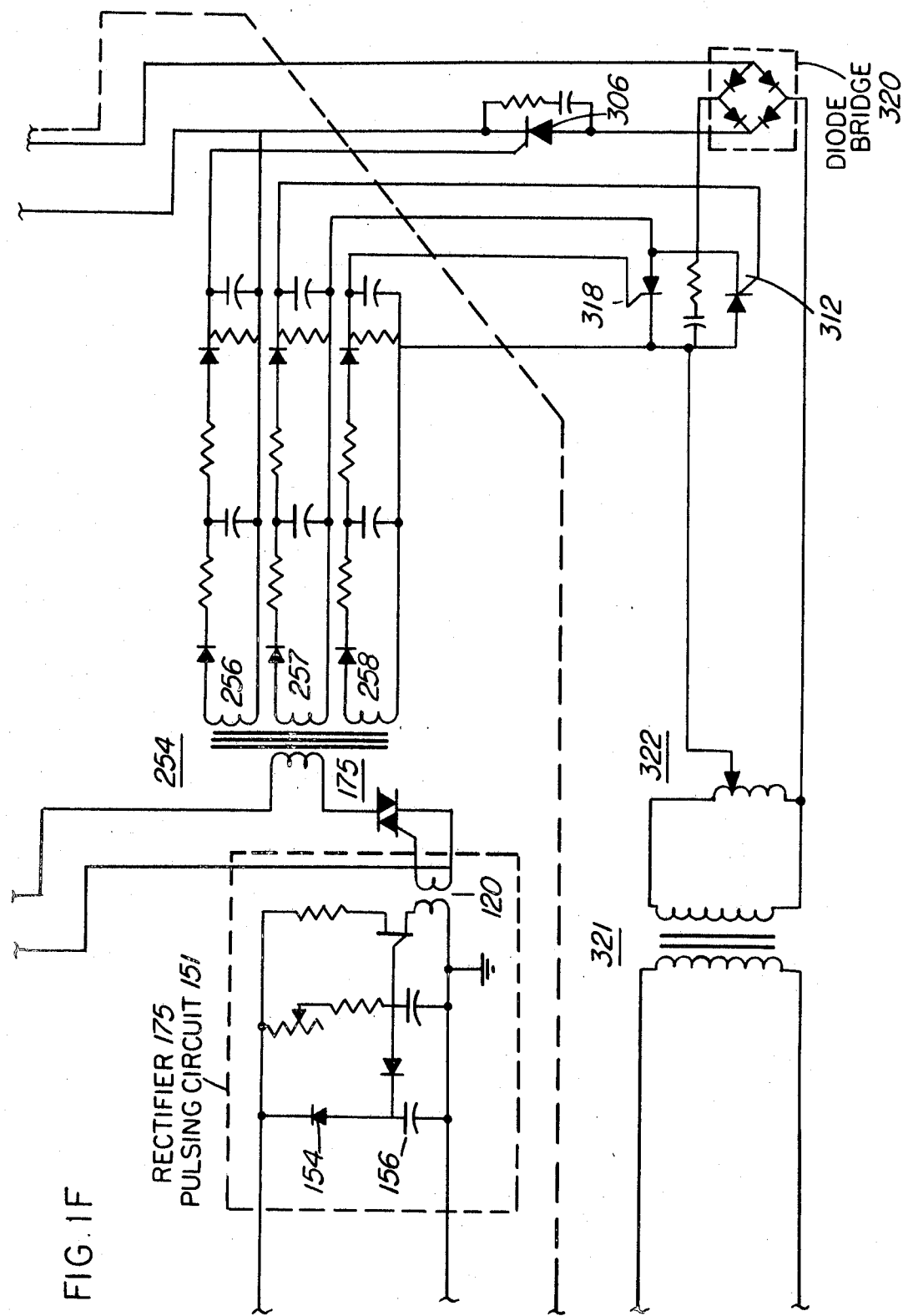

3,514,682
VARIABLE SPEED MOTOR CONTROL ARRANGEMENT

Lawrence G. Corey, Rockville, Conn., assignor to Arrow-Hart, Inc., Hartford, Conn., a corporation of Connecticut
Filed Feb. 24, 1967, Ser. No. 618,379
Int. Cl. H02p 3/24
U.S. Cl. 318—212                                                 15 Claims

ABSTRACT OF THE DISCLOSURE

An electrical control circuit for continuously varying the speed of a motor armature. Motor accelerating and decelerating circuit combinations are respectively adapted to alternately supply adjustable amounts of alternating current motor driving power, and dynamic braking direct current energy to selected motor windings.

---

Figure 1E:
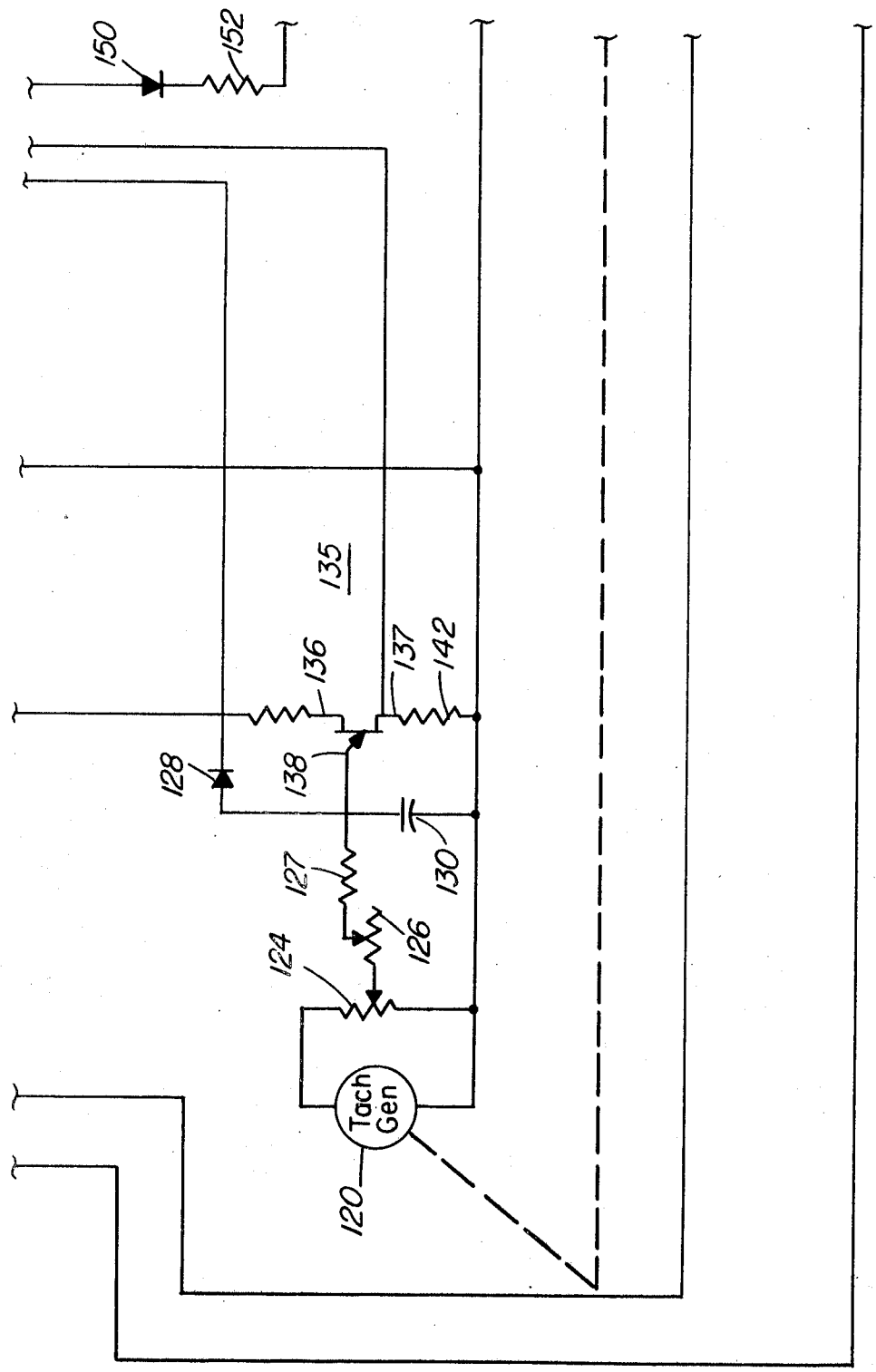

This invention relates to electronic control circuits and, more specifically, to an adjustable circuit configuration for continuously varying the speed of a motor armature.

A great many applications for electric motors require electronic speed regulating circuits. For example, many machine tools have a speed control which is adjusted in accordance with the particular material being operated upon.

In addition, in applications where yarn, ribbon, thread or the like is being wound on a revolving spool, it has been found desirable to feed the strand material to the spool via a motor which traverses such material across the length of the spool at continuously varying speeds. Such an organization obviates collapsing and knotting problems which otherwise obtain where a constant motor speed causes the strand material to be wound directly upon itself during successive transversals of the material across the spool.

Prior arrangements have provided contact limit switches to cycle the strand feeding motor between driven and idle, or the other operative modes. Such arrangements have been characterized by significant undesirable constant motor speed intervals, and also fixed, rather than adjustable motor speed time variations.

It is therefore an object of the present invention to provide an improved motor control arrangement.

More specifically, an object of the present invention is the provision of an electronic motor control circuit for continuously varying the speed of a regulated motor in accordance with fully adjustable time gradients.

It is another object of the present invention to provide an electronic motor control organization which employs solid state, rather than less reliable and slower acting electromechanical switching elements.

These and other objects of the present invention are realized in a specific, illustrative electronic motor control circuit for continuously varying the speed of a motor. The arrangement includes a first and second plurality of silicon controlled rectifiers for respectively applying accelerating alternating current power, and an armature decelerating unipolar potential to the motor windings. The two silicon controlled rectifier pluralities are alternatively rendered conductive by two bilaterally conducting semiconductor rectifiers respectively associated therewith under control of gated relaxation oscillator circuitry. In particular, the decelerating motor control mode is selected by bistable control elements when the output of a motor speed sensing tachometer exceeds an adjustable threshold level, while an adjustable one-shot timing delay circuit is employed to regulate the duration of the intervals between successive accelerating cycles.

A complete understanding of the present invention, and of the above and other objects and features thereof, may be gained from a consideration of the following detailed description of an illustrative embodiment thereof presented hereinbelow in conjunction with the accompanying drawing in which:

FIGS. 1A through 1F, arranged in accordance with FIG. 3, comprise a schematic diagram of a motor control circuit arrangement which illustrates the principles of the present invention;

FIG. 2 is a graph depicting the speed characteristic for a motor 10 shown in FIG. 1D; and FIG. 3 illustrates the spacial relationship of FIGS. 1A through 1F.

Referring now to FIGS. 1A through 1F, hereinafter referred to as composite FIG. 1, there is shown an electronic circuit for continuously varying the armature speed of a motor 10, which may illustratively comprise a well-known three phase, squirrel cage induction embodiment having field winding terminals 11, 12, and 13. The motor 10 may be employed, for example, to feed yarn or other strand material to a driven take-up spool by traversing the spool with the strand material at a continuously varying rate.

A source of three phase power 20 sequentially supplies three sinusoidal power phases A, B, and C to the motor winding terminals 11, 12, and 13 via a plurality of semiconductor rectifier devices specifically considered hereinafter. It is noted at this point, however, that the elements in a functional block 390 comprise phase control circuitry for regulating the amount of power supplied to the motor 10, while a plurality of silicon controlled rectifiers 200, 206, 390 and 396 determine the time interval during which motor accelerating, as opposed to decelerating, power is supplied to the motor 10 winding terminals 11, 12 and 13.

To illustrate the manner in which the FIG. 1 circuit arrangement operates to vary the speed of the motor 10, assume that a control switch 30 is closed, thereby connecting a source of conventional alternating current line power 15 to a diode bridge 35 through an isolating transformer 32. The bridge 35 comprises a full wave rectifier configuration, and produces unipolar, contiguous half-cycle sinusoidal pulses which are converted to unregulated direct current by a filter comprising a surge resistor 39 and a shunt capacitor 40. This potential is stepped down to a lower amplitude, finely regulated direct current voltage by a Zener diode 44 acting in conjunction with a series voltage dropping resistor 42 and a parallel storage capacitor 46.

The voltage first established across the Zener diode 44 and the capacitor 46 responsive to the switch 30 being closed is coupled by a capacitor 64 to the base of a transistor 68 which is thereby rendered conductive. The resulting current passing through the transistor 68 flows into the gate terminal of a silicon controlled rectifier 74, thereby activating this device. Accordingly, the rectifier 74 saturates, and the anode thereof approaches reference, or ground potential.

The transistor 68 remains conductive until the capacitor 64 charges to the potential across the Zener diode 44 through a resistor 65, upon which occurrence the device 68 is permanently rendered inactive as long as the control switch 30 remains closed. The silicon controlled rectifier 74 is held conductive through its characteristic thyratron-type action irrespective of the absence of gate drive previously supplied thereto by the transistor 68.

The low, near-ground potential across the rectifier 74 gives rise to two distinct circuit functions. First, a diode 54 connected to the anode of the rectifier 74 clamps the emitter of a unijunction transistor 55 in a deceleration timing circuit 48 to ground, thereby rendering the circuit 48 inoperative. Then also, this low potential prevents a rectifier 175 pulsing circuit 151 from operating by inhibiting direct current working voltage from being supplied thereto by way of a diode 150 and a resistor 152.

Coincident with the above described operation, the direct current voltage across the filter capacitor 40 is supplied by two resistors 80 and 84 and a diode 82 to a rectifier 110 pulsing circuit 83. It is observed that a silicon controlled rectifier 78 connected to the junction of the resistor 80 and the diode 82 is not energized at this time by a unijunction transistor 135, and thereby does not shunt direct current away from the diode 82.

The voltage coupled by the diode 82 and the resistor 84 acts as a working supply for the functional block 83. That is, two capacitors 88 and 96 charge to this working potential through two resistors 92 and 94, and the base-2 and base-1 terminals 102 and 103 of a unijunction transistor 100 are forward biased by such working potential.

When the charging voltage across the capacitor 96 exceeds the conduction threshold of the unijunction transistor 100, which approximates the mean voltage characterizing the base-2 and base-1 terminals 102 and 103, the transistor 100 initiates conduction thereby providing a low impedance discharge path for the capacitor 96 through the primary winding of a transformer 106 via the transistor emitter and base-1 terminals 101 and 103. After the capacitor 96 has discharged, the unijunction device 100 terminates conduction until the element 96 again charges through the resistors 92 and 94 to the threshold conduction level of the transistor 100 when a current pulse will again flow through the transformer 106 primary winding. Thus, the pulsing circuit 83 oscillates in the above-described manner as long as working potential is supplied thereto. The repetition rate for the circuit 83, which is principally determined by the passive elements 92, 94 and 96, is made rapid with respect to the sixty cycle rate of the line voltage supplied by the source 15 and the transformer 32.

The current pulses generated by the circuit 83 are coupled by the transformer 106 to the gate terminal 113 of a bilaterally conductive controlled rectifier 110 which may comprise, for example, a Triac (a trademark of the General Electric Company for such a bilateral conducting element) semiconductor device. The properties of the bilateral controlled rectifier 110 are such that, upon having the gate terminal 113 thereof once energized by the transformer 106, it will conduct in the direction in which these so-called terminal-1 and terminal-2 electrodes 111 and 112 are forward biased by the voltage supplied thereto by input power of transformer 32. Accordingly, when the rectifier 110 pulsing circuit 83 oscillates responsive to the controlled rectifier 78 being nonconductive, the resulting high repetition rate pulses supplied to the gate of the device 110 render this semiconductor switching element conductive for nearly the full duration of each half cycle of the input alternating current voltage. Hence, with the above conditions obtaining, the voltage supplied by the input transformer 32 is applied at nearly full strength to the primary winding 181 of a transformer 180.

The transformer 180 steps down the input alternating current potential to about 40 volts in each of four isolated secondary windings 182 through 185. Examining the circuitry associated with the secondary winding 182, which is illustrative of the elements associated with the remaining secondary windings 183 through 185, the alternating current potential produced therein is half-wave rectified in a diode 189, and converted to direct current by a surge resistor 190 and a shunt filtering capacitor 191. This direct current potential is coupled by a resistor 192 and a reverse gate current inhibiting diode 195 to the gate terminal of a silicon controlled rectifier 200, thereby rendering the switching device 200 conductive whenever the anode and cathode thereof are forward biased by the positive half cycles of a the A power phase supplied by the three phase source 20. A resistor 196 and a capacitor 197 are connected between the gate and emitter terminals of the rectifier 200 to inhibit spurious voltage transient gating of the device 200.

The circuit loops associated with the remaining transformer 180 secondary windings 183, 184 and 185 function in an identical manner to respectively enable three silicon controlled rectifiers 206, 390 and 396 whenever the proper voltage polarity is supplied thereto by the source 20.

It is observed that the energized bilateral conduction device 110 thus connects the three phase power supplied thereto by the source 20 and the phase control circuit 390 to the motor 10 winding terminals 11, 12 and 13. In particular, positive and negative power phase A voltages are coupled to the winding terminal 11 by the silicon controlled rectifiers 200 and 206, respectively, and the rectifiers 390 and 396 function in a similar manner for phase B power. There is a direct connection for phase C to the motor terminal 13 since an open circuit for both the phase A and phase B paths negates any return path for the C phase. With alternating current power supplied by the source 20 to the winding terminals 11, 12 and 13, the armature of the motor 10 accelerates, as shown by the motor speed graph of FIG. 2 for the time intervals *a–b*, *c–d* and *e–f*. In the specific context of a strand feeding application for the motor 10, this results in the strand material being traversed across the length of a take-up spool at an increasing rate of speed.

As the motor increases in speed, a tachometer generator 120 which is coupled to the motor 10 armature supplies an increasing direct current potential to an emitter terminal 138 of the unijunction transistor 135 by way of a potentiometer 124 and two serial resistors 126 and 127. A capacitor 130 is connected in parallel with the transistor emitter terminal 138 for transient protection and also to ensure sufficient direct current to reliably turn on the device 135 at the appropriate time. The tachometer generator 120 may comprise a direct current yielding embodiment, or an alternating current structure with rectifier elements connected to the output thereof.

When the motor accelerates to a desired maximum speed S shown in FIG. 2, i.e., at the times *b*, *d* and *f* shown therein, the voltage output of the tachometer generator 120 is sufficient to fire the unijunction transistor 135, thereby impressing a positive going potential across a resistor 142 connected to the base-1 terminal 137 thereof. This positive potential is directly connected to the gate terminal of the silicon controlled rectifier 78 which is thereby rendered conductive.

As the rectifier 78 becomes activated, the resulting near-ground potential appearing at its anode gives rise to several circuit operations. First, working voltage is removed from the pulsing circuit 83 which therefore ceases to oscillate. Hence, the bilateral conductive rectifier 110 is turned off at the termination of the half-cycle of line power then flowing through the device 110. With the rectifier 110 open circuited, power is no longer applied to the transformer 180. Accordingly, the gate terminals of the rectifiers 200, 206, 390 and 396 are no longer energized, hence disabling these elements. Thus, the A and B power phase conduction paths are interrupted by the above circuit functioning, thereby effectively preventing all accelerating power from reaching the motor 10.

Then also, the negative transient at the anode of the controlled rectifier 78 is coupled by a commutating capacitor 76 to the anode of the silicon controlled rectifier 74 which is thus driven negatively, hence turning the rectifier 74 off. The resulting positive voltage which quickly follows at the anode of the controlled rectifier 74, in turn, back biases the diode 54 thus permitting a capacitor 52 in the deceleration timing circuit 48 to initiate charging towards the regulated voltage across the Zener diode 44. In addition, the newly appearing positive voltage at the anode of the rectifier 74 is supplied as working potential to the rectifier 175 pulsing circuit 151 via the diode 150 and the resistor 152.

The pulsing circuit 151 acts in a manner identical to the similar circuit 83 considered hereinabove and supplies rapidly recurring gating pulses to a bilateral conductive controlled rectifier 175 via a transformer 120. The enabled rectifier 175 operates to connect the line voltage of the input power transformer 32 to a transformer 254 and, more specifically, supplies a stepped down replica of this voltage to three isolated transformer secondary windings 256, 257, and 258. In a manner similar to that previously disclosed, the alternating current potential induced in the secondary windings 256, 257, and 258 respectively render three silicon controlled rectifiers 306, 312, and 318 conductive during the decelerating portion of each operative cycle, i.e., during the intervals b–c, d–e, and f–g shown in FIG. 2.

In the furtherance of a motor 10 decelerating mode of operation for the foregoing time intervals, an isolation and step down transformer 324 and an adjustable auto transformer 322 are employed to supply alternating current to a diode bridge 320 via the enabled rectifiers 312 and 318. The bridge 320 comprises a full wave rectifying structure, and supplies undulating unipolar half-wave current pulses through the activated controlled rectifier 306 to the motor 10 winding terminals 11 and 12. The pulsating direct current potential applies electrical dynamic braking action to the motor via the field winding connected to the terminals 11 and 12, and consequently decelerates the motor armature. This is shown in FIG. 2 by the negative slopes for the b–c, d–e, and f–g intervals.

As noted above, at the inception of the decelerating operation, i.e., at the times b, d, and f in FIG. 2, the capacitor 52 in the deceleration timing circuit 48 begins to charge to the regulated voltage across the Zener diode 44. When the voltage across the capacitor 52 attains the switching threshold level for the unijunction transistor 55 which is a value intermediate the voltages characterizing the transistor 55 base-2 and base-1 terminals 56 and 57, the device 55 becomes conductive. Such conduction signifies the end of each deceleration interval and occurs at the times c, e, and g in FIG. 2.

When the unijunction transistor 55 fires, the capacitor 52 discharges across a resistor 60 connected to the base-1 terminal 57, thereby producing a positive voltage across this resistor which activates the silicon controlled rectifier 74 by way of a diode 66. The resulting negative voltage transient at the anode of the rectifier 74 is coupled by the commutating capacitor 76 to the controlled rectifier 74, hence turning off this latter device.

Hence the composite FIG. 1 arrangement is at this time returned to its initial state, and begins the next cyclic motor acceleration cycle.

It is noted at this point that capacitors 88 and 156 are respectively included in the pulsing circuits 83 and 151 to produce a cross over delay, i.e., to slow down the first pulse generated by each circuit 83 or 151 until the previously conductive bilateral controlled rectifier 110 or 175 has terminated conduction. This assures that the three phase alternating current power and the undulating DC braking potential are not applied to the motor winding terminals 11 and 12 at the same time. Also, two diodes 86 and 154 are respectively included in the pulsing circuits 83 and 151 to discharge the capacitors 88 and 156 after the circuits terminate their pulsing operation responsive to the bistable, flip-flop type action of the controlled rectifiers 74 and 78 acting in conjunction with the commutating capacitor 76.

As previously mentioned above, the amount of armature accelerating power supplied to the motor 10 while the semiconductors 110, 200, 206, 390 and 396 are conducting, and therefore the time acceleration gradient shown for the intervals a–b, c–d, and e–f in FIG. 2, is controlled by the phase control circuit 390 and the elements ancillary thereto. In overall scope, such power is regulated by controlling the portion of the full 180° positive half-cycles when A, B, and C phase power is permitted to respectively flow through three silicon controlled rectifiers 330, 340, and 350 included in the control circuit 390.

More particularly, a transformer 365 and a diode bridge 368 produce full wave rectified alternating current pulses which are converted to a direct current voltage by a surge resistor 370 and a filter capacitor 372, and further regulated by a Zener diode 376 and a series voltage dropping resistor 374. The Zener output voltage is adjustably reduced by a variable voltage divider including resistors 378, 380 and 382, and coupled by a parallel diode 384-capacitor 386 combination to a three phase regulating circuit 360. The three power phase A, B, C are also supplied to the circuit 360 by the source 20 thereof.

The three phase regulating circuit 360 may embody any of the well-known arrangements thereof which supply gating pulses at three output ports 361, 362, and 363 thereof during at least some portion of the positive half-cycles of the A, B, and C power phases respectively. That is, the portion of the A, B, and C power phases during which the circuit 360 activates the rectifiers 330, 340, and 350 in the phase control circuit 390 via the ports 361, 362, and 363 is a direct function of the direct current potential supplied as an input signal to the circuit 360 by the diode 384 and the capacitor 386. The three phase regulating circuit 360 may comprise, for example, a structure available from the Sprague Electric Company which employs saturable reactor control elements for selectively controlling the firing phase angle.

The accelerating and decelerating properties illustrated in FIG. 2 for the motor 10 may be adjusted in the following manner. The rate of acceleration, i.e., the slope of the curve of FIG. 2 in the intervals a–b, c–d, and e–f is controlled by regulating the amount of alternating current power which the source 20 supplies to the motor winding terminals 11, 12 and 13 via the phase control circuit 390. This is regulated by varying the resistance of the voltage divider element 378 which supplies a variable direct current bias potential to the input of the three phase regulating circuit 360.

The rate of deceleration for the motor 10, i.e., the downward slope shown in FIG. 2 for the intervals b–c, d–e, and f–g, is controlled by adjusting the auto-transformer 322, thereby impressing varying amounts of dynamic electrical braking at the motor 10 terminals 11 and 12. Finally, the length of the deceleration intervals is controlled by adjusting the variable resistor 348 in the timing circuit 48, while the peak speed S of FIG. 2 is adjusted by varying the resistor 124 (coarse) and/or the resistor 126 (fine).

The circuit functions effected by the remaining elements in FIG. 1 will now be considered for completeness. First, a number of bidirectional voltage limiters 400, 401, 402, 404, 406, 408, and 410 such as thyrectors, are employed between the three power phases to protect the silicon controlled rectifiers from reverse breakdown due to power surges. Also, a number of series resistor-capacitor combinations are connected in parallel with the silicon controlled rectifiers to prevent these devices from being inadvertently turned on by voltage transient effects. Finally, three diodes 336, 348, and 358 are respectively connected in parallel with the phase control circuit 390 rectifiers 330, 340, and 350 to provide a conduction path for the negative half-cycles of the A, B, and C power phases.

It is to be understood that the above-described arrangement is only illustrative of the application of the principles of the present invention. Numerous other arrangements may be devised by those skilled in the art without departing from the spirit and scope of the invention.

What is claimed is:

1. In combination in a control arrangement for continuously varying the speed of a motor between desired maximum and minimum rates of speed, a motor including at least one winding, a source of motor energizing power, controlled switching means for selectively connecting said source to said winding, a source of unipolar voltage, first additional controlled switching means for selectively connecting said unipolar voltage source to said motor winding, control means for alternately rendering said switching means and said first additional means conductive to respectively pass accelerating and decelerating electrical energy to said motor winding, motor speed sensing means, said control means comprising controlling means including timing means connected to said motor speed sensing means for rendering said first additional controlled switching means conductive for a timed interval responsive to said speed sensing means signaling that said maximum speed has been attained, said motor thereby being decelerated from said maximum speed toward said minimum speed during said timed interval, said control means including additional controlling means for rendering said controlled switching means conductive to accelerate said motor after said timed interval has elapsed, said motor thereby alternately increasing and decreasing its speed substantially free from periods of constant speed.

2. A combination as in claim 1 wherein said motor speed sensing means comprises a tachometer generator coupled to said motor, said timing means being activated by said tachometer generator for selectively activating said first additional switching means.

3. A combination as in claim 2 further comprising means connected to said source of motor energizing power for varying the amount of said power supplied to said motor.

4. In combination in a control arrangement for continuously varying the speed of a motor between desired maximum and minimum rates of speed, a motor including at least one winding, a source of motor energizing power, controlled switching means for selectively connecting said source to said winding, a source of unipolar voltage, first additional controlled switching means for selectively connecting said unipolar voltage source to said motor winding, motor speed sensing means, control means including timing means connected to said motor speed sensing means for rendering said first additional controlled switching means conductive for a timed interval responsive to said speed sensing means signaling that said maximum speed has been attained, said motor thereby being decelerated from said maximum speed toward said minimum speed during said timed interval, and additional control means for rendering said controlled switching means conductive to accelerate said motor after said timed interval has elapsed, wherein said control means and said additional control means include second and third additional controlled switching means for respectively activating said switching means and said first additional switching, and bistable means for alternating energizing said second and third additional switching means.

5. A combination as in claim 4 wherein said bistable means includes fourth and fifth additional controlled switching means and a commutating capacitor connected thereto.

6. A combination as in claim 5 wherein said motor speed sensing means comprises a tachometer generator coupled to said motor for selectively activating said third additional switching means via said bistable means, said timing circuit means being activated by said tachometer generator for selectively enabling said second additional switching means via said bistable means.

7. A combination as in claim 6 wherein said switching means and said additional switching means comprises silicon controlled rectifiers each including a gate terminal.

8. A combination as in claim 7 wherein said second and third additional switching means comprises silicon controlled rectifiers of the bilateral conduction type.

9. A combination as in claim 7 wherein said control means and said additional control means further comprise first and second relaxation oscillator means respectively connected to said fourth and fifth additional switching means for selectively supplying repetitive electrical gating pulses to said gate terminals included on said silicon controlled rectifiers embodying said second and third additional switching means.

10. In combination in an arrangement for continuously varying the speed of a motor for supplying strand material to a take-up spool, a source of motor accelerating electrical power, at least one silicon controlled rectifier for selectively connecting said source to said motor, a source of unipolar motor braking electrical power, at least one first additional silicon controlled rectifier for selectively connecting said unipolar source to said motor, bistable control means for alternately energizing said silicon controlled rectifier and said additional silicon controlled rectifier, said bistable control means including means for enabling said silicon controlled rectifier for accelerating said motor when residing in its first stable state and for enabling said first additional silicon controlled rectifier for decelerating said motor when residing in its second stable state, means for sensing the speed of said motor exceeding the desired maximum speed for setting said bistable means to its second stable state, and deceleration timing means connected to said speed sensing means for setting said bistable means to its first stable state a delayed interval after receiving maximum motor speed indicating signal from said speed sensing means.

11. In combination in an arrangement for continuously varying the speed of a motor for supplying strand material to a take-up spool, a source of motor accelerating electrical power, at least one silicon controlled rectifier for selectively connecting said source to said motor, a source of unipolar motor braking electrical power, at least one first additional silicon controlled rectifier for selectively connecting said unipolar source to said motor, bistable control means for enabling said silicon controlled rectifier for accelerating said motor when residing in its first stable state and for enabling said first additional silicon controlled rectifier for decelerating said motor when residing in its second stable state, means for sensing the speed of said motor exceeding the desired maximum speed for setting said bistable means to its second stable state, and deceleration timing means connected to said speed sensing means for setting said bistable means to its first stable state a delayed interval after receiving maximum motor speed indicating signal from said speed sensing means, further including first and second circuit means for respectively connecting said bistable control means to said silicon controlled rectifier and said additional silicon controlled rectifier, each of said connecting means including a controlled rectifier, a relaxation oscillating circuit arrangement for respectively activating said controlled rectifier, a transformer having a primary winding connected to said controlled rectifier and a plurality of secondary windings, and rectifying means and filter means connecting each of said secondary windings to a gate terminal of a different one of said silicon controlled rectifier or said first additional silicon controlled rectifier.

12. A combination as in claim 11 wherein said silicon controlled rectifier included in each of said connecting circuit means is of the bilateral conduction type.

13. In combination, a motor having at least one winding, first controlled rectifier means, a source of motor accelerating electrical power connected to said motor winding by said first controlled rectifier means, second controlled rectifier means, dynamic braking unipolar voltage source means connected to said motor winding by said second controlled rectifier means, bistable control means including third and fourth controlled rectifier means and a commutating capacitor connected to the anodes of said rectifier means, a deceleration time delay generator connected to a gate terminal on said third controlled rectifier means, motor speed sensing means connected to said deceleration generator and to a gate terminal on said fourth controlled rectifier means, a source of alternating current voltage, fifth and sixth silicon controlled rectifier means, first and second transformers respectively including at least one secondary winding and a primary winding connecting said fifth and sixth controlled rectifier means to said alternating current source, first and second oscillating circuit means respectively connected to said anodes of said third and fourth controlled rectifier means for selectively repetitively pulsing the gate terminals of said fifth and sixth controlled rectifier means, and rectifying and filtering means connected to each secondary winding of said first transformer for supplying gating energy to said first controlled rectifier means, and additional rectifying and filter means connected to each secondary winding of said second transformer for selectively supplying gating energy to said second controlled rectifier means.

14. A combination as in claim 13 wherein said fifth and sixth controlled rectifier means comprise bilateral conducting embodiments.

15. A combination as in claim 14 further comprising means for varying the amount of alternating energy supplied to said motor, and means for controlling the amount of dynamic braking unipolar power supplied to said motor.

References Cited

UNITED STATES PATENTS

| | | | |
|---|---|---|---|
| 3,090,901 | 5/1963 | Shaw | 318—212 |
| 3,250,975 | 5/1966 | Pepper | 318—212 |
| 3,341,758 | 11/1967 | Plumpe | 318—212 |
| 3,398,343 | 8/1968 | Plumpe | 318—212 |
| 3,408,550 | 10/1968 | Graham | 318—212 |
| 2,763,824 | 9/1956 | Bacheler | 242—18.1 |
| 3,105,181 | 9/1963 | Sanborn | 318—369 |
| 3,260,911 | 7/1966 | Rasmussen | 318—373 |
| 3,302,089 | 1/1967 | Rosa et al. | 318—356 |
| 3,375,425 | 3/1968 | Bell | 318—302 |

ORIS L. RADER, Primary Examiner

K. L. CROSSON, Assistant Examiner

U.S. Cl. X.R.

318—302, 369, 373; 242—18